(12) United States Patent
Suzuki et al.

(10) Patent No.: US 10,480,381 B2
(45) Date of Patent: Nov. 19, 2019

(54) VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Tomoya Suzuki, Nagakute (JP); Takashi Suzuki, Miyoshi (JP); Mitsuyori Matsumura, Seto (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 16 days.

(21) Appl. No.: 15/804,124

(22) Filed: Nov. 6, 2017

(65) Prior Publication Data
US 2018/0156097 A1 Jun. 7, 2018

(30) Foreign Application Priority Data
Dec. 6, 2016 (JP) ................................. 2016-236618

(51) Int. Cl.
*B60H 1/02* (2006.01)
*F01N 9/00* (2006.01)
*F01N 3/029* (2006.01)

(52) U.S. Cl.
CPC ............ *F01N 9/002* (2013.01); *F01N 3/029* (2013.01); *B60H 1/025* (2013.01); *F01N 2430/00* (2013.01); *F01N 2590/11* (2013.01); *F01N 2900/10* (2013.01); *F01N 2900/1404* (2013.01); *F01N 2900/1631* (2013.01); *Y02T 10/47* (2013.01)

(58) Field of Classification Search
CPC ........ F01N 3/021; F01N 3/023; F01N 3/0238; F01N 3/029; F01N 9/00; F01N 9/002; F01N 2250/02; F01N 2260/04; F01N 2270/00; F01N 2430/00; F01N 2430/02; F01N 2430/06; F01N 2430/08; F01N 2250/04; F01N 2560/08; F01N 2610/085
USPC ......... 60/272, 273, 284, 285–289, 291, 295, 60/311
See application file for complete search history.

(56) References Cited

U.S. PATENT DOCUMENTS 6,421,599 B1 * 7/2002 Lippa ................... B60H 1/3208
701/102
2015/0094894 A1 * 4/2015 Ito ............................. B60L 1/02
701/22

FOREIGN PATENT DOCUMENTS

JP 2015-202832 11/2015
WO WO 2015/159218 A2 10/2015

* cited by examiner

*Primary Examiner* — Mark A Laurenzi
*Assistant Examiner* — Mickey H France
(74) *Attorney, Agent, or Firm* — Finnegan, Henderson, Farabow, Garrett & Dunner, LLP (57) ABSTRACT

A vehicle includes: an internal combustion engine; a filter collecting particulate matter contained in exhaust gas of the internal combustion engine; a heater core configured to be able to heat up a vehicle cabin; and an electronic control unit. The electronic control unit is configured to execute regeneration cut control and heating control. The regeneration cut control is a control for regenerating the filter by stopping a fuel supply to the internal combustion engine and supplying oxygen to the filter in a state where an output shaft of the internal combustion engine rotates. The heating control is a control for bringing the internal combustion engine into a combustion state and heating by the heater core. The electronic control unit is configured not to execute the heating control but to execute the regeneration cut control when the heating control is requested and the regeneration cut control is requested.

4 Claims, 4 Drawing Sheets

VEHICLE AND CONTROL METHOD FOR VEHICLE

INCORPORATION BY REFERENCE

The disclosure of Japanese Patent Application No. 2016-236618 filed on Dec. 6, 2016 including the specification, drawings and abstract is incorporated herein by reference in its entirety.

BACKGROUND

1. Technical Field

The present disclosure relates to a vehicle including: a filter that captures particulate matter contained in exhaust gas of an internal combustion engine; and a heater configured to be able to heat up a vehicle cabin by using exhaust heat of the internal combustion engine, and to a control method for a vehicle.

2. Description of Related Art

Particulate matter (hereinafter also referred to as "PM") are contained in exhaust gas of an internal combustion engine such as a gasoline engine or a diesel engine. For this reason, there is a case where a PM collection filter (hereinafter referred to as a "filter") such as a gasoline particulate filter (GPF) or a diesel particulate filter (DPF) is mounted on an exhaust passage of the internal combustion engine. In recent years, needs for the filters have been intensified along with tightening of particulate number (PN) regulations, which is prominent in Europe.

It has been concerned that, when the PM is accumulated on the filter, resistance that is generated at a time when the exhaust gas passes the filter is increased, which possibly influences performance of the internal combustion engine and hinders normal actuation of parts (an exhaust valve and the like) of an exhaust system. Accordingly, control for burning the PM, which is accumulated on the filter, by using heat of the exhaust gas of the internal combustion engine to regenerate the filter (hereinafter also referred to as "filter regeneration control") is executed at appropriate timing.

For example, a hybrid vehicle in which the filter regeneration control is executed is disclosed in Japanese Patent Application Publication No. 2015-202832 (JP 2015-202832 A). In this hybrid vehicle, when the filter regeneration control is requested, control for increasing a temperature of the filter to a specified temperature or higher and thereafter stopping a fuel supply to the internal combustion engine (hereinafter also referred to as "regeneration cut control") is executed, and a motor is used to run the internal combustion engine. In this way, a sufficient amount of oxygen to burn the PM is supplied from the internal combustion engine to the filter. Thus, burning of the PM is promoted.

SUMMARY

A vehicle that includes a heater (such as a heater core) configured to be able to heat up a vehicle cabin by using exhaust heat of the internal combustion engine has been available. In the vehicle that includes the heater using the exhaust heat of the internal combustion engine, in general, when a heating request is made, control for supplying fuel to the internal combustion engine, bringing the internal combustion engine into a combustion state (a state where the fuel is combusted in the internal combustion engine), and heating up the vehicle cabin by using the exhaust heat of the internal combustion engine (hereinafter also referred to as "heating control") is executed.

The heating control and the regeneration cut control contradict each other in a point that, while the heating control brings the internal combustion engine into the combustion state to use the exhaust heat of the internal combustion engine, the regeneration cut control stops the fuel supply to the internal combustion engine, so as to supply oxygen to the filter. Accordingly, in a vehicle that is configured to be able to selectively execute both types of the control, filter regeneration opportunities by the regeneration cut control are possibly reduced. More specifically, in the case where the regeneration cut control is not executed but the heating control is executed in a situation where both of the regeneration cut control and the heating control are requested, the internal combustion engine is brought into the combustion state. As a result, the sufficient amount of oxygen cannot be supplied to the filter. Thus, it is concerned that the PM accumulated on the filter cannot sufficiently be removed.

The present disclosure secures filter regeneration opportunities in a vehicle that is configured to be able to selectively execute heating control and regeneration cut control and in a control method for a vehicle, the heating control using exhaust heat of an internal combustion engine, and the regeneration cut control stopping a fuel supply to the internal combustion engine.

A first aspect of the present disclosure is a vehicle. The vehicle includes an internal combustion engine, a filter, a heater, and an electronic control unit. The filter is configured to collect particulate matter contained in exhaust gas of the internal combustion engine. The heater is configured to be able to heat up a vehicle cabin by using exhaust heat of the internal combustion engine. The electronic control unit is configured to execute regeneration cut control and heating control. The regeneration cut control is a control for regenerating the filter by stopping a fuel supply to the internal combustion engine and supplying oxygen to the filter in a state where an output shaft of the internal combustion engine rotates. The heating control is a control for bringing the internal combustion engine into a combustion state and heating by the heater. The electronic control unit is configured not to execute the heating control but to execute the regeneration cut control when the heating control is requested and the regeneration cut control is requested.

According to the above configuration, in the case where the regeneration cut control is requested, the heating control is not executed, but the regeneration cut control is executed even when the heating control is requested. Accordingly, filter regeneration opportunities are suppressed from being reduced for the heating control. As a result, in the vehicle that is configured to be able to selectively execute the heating control, in which the exhaust heat of the internal combustion engine is used, and the regeneration cut control for stopping the fuel supply to the internal combustion engine, the filter regeneration opportunities can be secured.

The vehicle may include a first rotary electric machine connected to the internal combustion engine. The electronic control unit may be configured to stop the fuel supply to the internal combustion engine and make the output shaft of the internal combustion engine rotate by using power of the first rotary electric machine when executing the regeneration cut control.

According to the above configuration, even when the fuel supply to the internal combustion engine is stopped by the regeneration cut control, the first rotary electric machine can maintain the internal combustion engine in a rotating state.

In this way, a required amount of oxygen for regeneration of the filter can stably be supplied from the internal combustion engine to the filter.

The vehicle may include a drive wheel and a second rotary electric machine connected to the drive wheel. The electronic control unit may be configured to make the drive wheel rotate by using power of the second rotary electric machine during execution of the regeneration cut control.

According to the above configuration, even when the fuel supply to the internal combustion engine is stopped by the regeneration cut control, the vehicle can travel by using power of a rotary electric machine for traveling. Thus, the vehicle can continue traveling while the filter is regenerated.

A second aspect of the present disclosure is a control method for a vehicle. The vehicle includes an internal combustion engine, a filter, a heater, and an electronic control unit. The filter is configured to collect particulate matter contained in exhaust gas of the internal combustion engine. The heater is configured to be able to heat up a vehicle cabin by using exhaust heat of the internal combustion engine. The electronic control unit is configured to execute regeneration cut control and heating control. The control method includes not executing, by the electronic control unit, the heating control but executing the regeneration cut control when the heating control is requested and the regeneration cut control is requested. The regeneration cut control is a control for regenerating the filter by stopping a fuel supply to the internal combustion engine and supplying oxygen to the filter in a state where an output shaft of the internal combustion engine rotates. The heating control is a control for bringing the internal combustion engine into a combustion state and heating by the heater.

According to the above configuration, in the case where the regeneration cut control is requested, the heating control is not executed, but the regeneration cut control is executed even when the heating control is requested. Accordingly, filter regeneration opportunities are suppressed from being reduced for the heating control. As a result, in the vehicle that is configured to be able to selectively execute the heating control, in which the exhaust heat of the internal combustion engine is used, and the regeneration cut control for stopping the fuel supply to the internal combustion engine, the filter regeneration opportunities can be secured.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A description will hereinafter be made on this embodiment with reference to the drawings. In the following description, the same components are denoted by the same reference numerals. Names and functions of those are also the same. Thus, a detailed description thereon will not be repeated.

Figure 1:
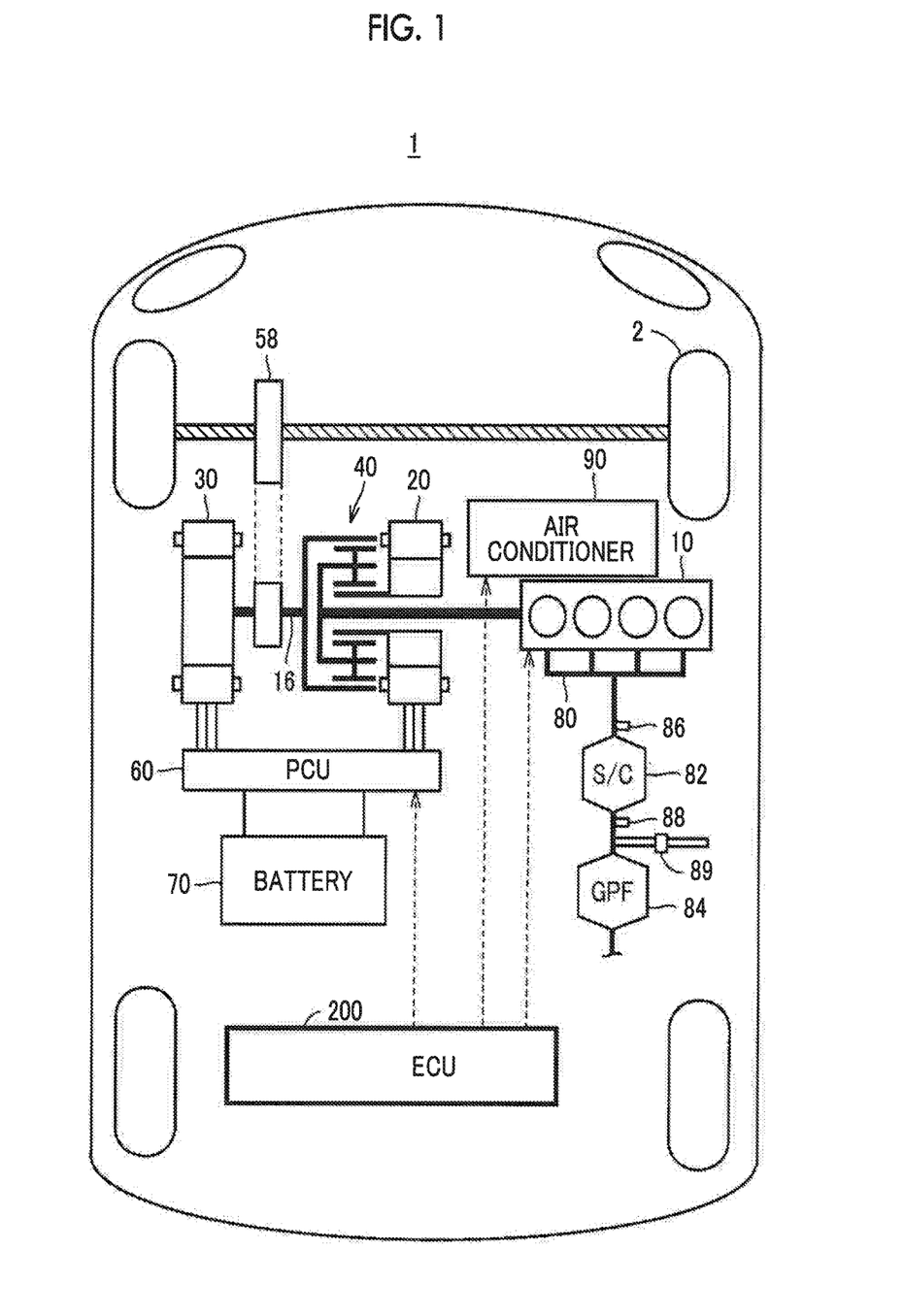
FIG. 1 is an overall block diagram of a vehicle.

FIG. 1 is an overall block diagram of a vehicle 1 according to this embodiment. The vehicle 1 includes an internal combustion engine 10, drive wheels 2, an output shaft 16, a first motor generator (hereinafter referred to as a "first MG") 20, a second motor generator (hereinafter referred to as a "second MG") 30, a power split mechanism 40, a speed reducer 58, a power control unit (PCU) 60, a battery 70, an air conditioner 90, and an electronic control unit (ECU) 200.

This vehicle 1 is a hybrid vehicle that travels by drive power output from at least one of the internal combustion engine 10 and the second MG 30. In this embodiment, the internal combustion engine 10 is a gasoline engine and is controlled on the basis of a control signal from the ECU 200. Note that the internal combustion engine 10 may be a diesel engine.

One end of an exhaust passage 80 is coupled to the internal combustion engine 10. The other end of the exhaust passage 80 is coupled to a muffler (not shown). A catalyst 82 and a filter 84 are provided in the middle of the exhaust passage 80.

The catalyst 82 oxides unburned components contained in exhaust gas that is discharged from the internal combustion engine 10, and reduces oxide components.

The filter 84 is arranged at a position on a downstream side of the catalyst 82 in the exhaust passage 80. The filter 84 is a GPI; that collects particulate matter (PM) contained in the exhaust gas. The collected PM is accumulated on the filter 84, Note that the filter 84 may also have a similar function to that of the catalyst 82. In this case, the catalyst 82 may not be provided. In addition, the filter 84 may be arranged at a position on an upstream side of the catalyst 82 in the exhaust passage 80.

The power split mechanism 40 splits the power generated by the internal combustion engine 10 into power that is transmitted to the drive wheels 2 via the speed reducer 58 and power that is transmitted to the first MG 20.

For example, each of the first MG 20 and the second MG 30 is a three-phase AC rotary electric machine. The first MG 20 and the second MG 30 are driven by the PCU 60.

The first MG 20 primarily functions as a generator (the rotary electric machine for electric power generation) that generates electric power by using the power of the internal combustion engine 10 split by the power split mechanism 40. Note that the first MG 20 also functions as a motor that causes rotation of a crankshaft of the internal combustion engine 10 by receiving the electric power from the battery 70 when necessary.

The second MG 30 primarily functions as a motor (the rotary electric machine for traveling) that provides the drive power to the drive wheels 2 by using at least one of the electric power stored in the battery 70 and the electric power generated by the first MG 20. The second MG 30 also functions as a generator that generates the electric power through regenerative braking during deceleration of the vehicle 1 and stores the electric power in the battery 70 via the PCU 60.

The power split mechanism 40 mechanically couples each two of three elements that are the output shaft 16 for causing rotation of the drive wheels 2, the crankshaft of the internal combustion engine 10, and a rotary shaft of the first MG 20. The power split mechanism 40 makes any one of the above-described three elements a reaction element and thereby allows power transmission between the other two elements. A rotary shaft of the second MG 30 is coupled to the output shaft 16.

The power split mechanism 40 is a planetary gear mechanism that includes a sun gear, a pinion gear, a carrier, and a ring gear. The pinion gear meshes with each of the sun gear and the ring gear. The carrier supports the pinion gear in a manner to allow rotation thereof and is coupled to the crankshaft of the internal combustion engine 10. The sun gear is coupled to the rotary shaft of the first MG 20. The ring gear is coupled to the rotary shaft of the second MG 30 and the speed reducer 58 via the output shaft 16.

Note that FIG. 1 shows a configuration example in which the crankshaft of the internal combustion engine 10, the rotary shaft of the first MG 20, the rotary shaft of the second MG 30, and the output shaft 16 are arranged on the same rotation center line; however, arrangement of these is not limited to that shown in FIG. 1. For example, the crankshaft of the internal combustion engine 10 and the rotary shaft of the first MG 20 may be arranged on the same first rotation center line, the rotary shaft of the second MG 30 may be arranged on a second rotation center line that is parallel with the first rotation center line, and the output shaft 16 may be arranged on a third rotation center line that is parallel with the first rotation center line and the second rotation center line.

The speed reducer 58 transmits the power from the power split mechanism 40 and the second MG 30 to the drive wheels 2. In addition, the speed reducer 58 transmits a reaction force that is received by each of the drive wheels 2 from a road surface to the power split mechanism 40 and the second MG 30.

The PCU 60 is controlled on the basis of the control signal from the ECU 200 and converts DC power, which is stored in the battery 70, to AC power used to drive the first MG 20 and the second MG 30. The PCU 60 includes: a converter that converts a voltage, an inverter that converts the electric power (neither of them is shown), and the like, for example.

The battery 70 is a secondary battery that is configured by including nickel hydrogen, lithium-ion, or the like, for example. A voltage of the battery 70 is approximately 200 V, for example. The battery 70 may be charged by using the electric power generated by the first MG 20 and/or the second MG 30 as described above, and may also be charged by using the electric power supplied from an external power supply (not shown). Note that the battery 70 is not limited to the secondary battery and may be a large-capacitance capacitor.

The air conditioner 90 is a device that heats up and cools a vehicle cabin. The air conditioner 90 is configured to be able to heat up and cool the vehicle cabin by using a refrigeration cycle by a refrigerant and is also configured to be able to heat up the vehicle cabin by using exhaust heat of the internal combustion engine 10.

Figure 2:
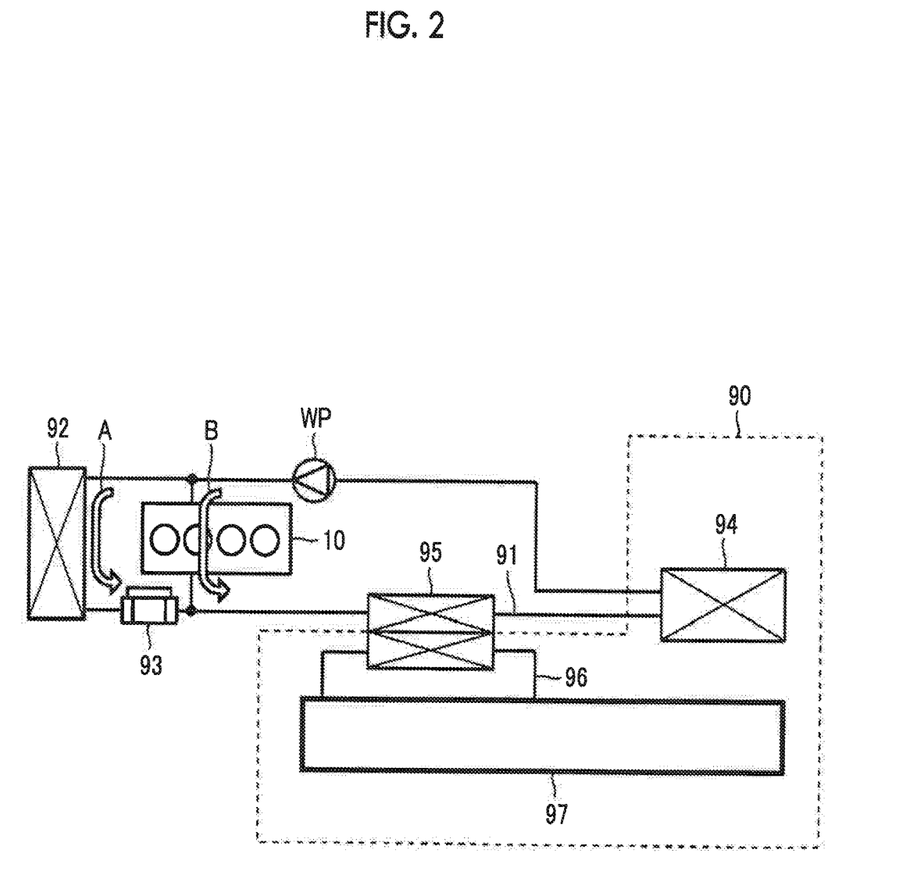
FIG. 2 is a schematic view of one example of a configuration of an air conditioner.

FIG. 2 is a schematic view of one example of a configuration of the air conditioner 90. The air conditioner 90 includes: a refrigeration cycle device 97 that is configured to be able to cool and heat up the vehicle cabin by using the refrigeration cycle by the refrigerant; and a heater core 94 that is configured to be able to heat up the vehicle cabin by using the exhaust heat of the internal combustion engine 10.

The refrigeration cycle device 97 is configured to be able to cool and heat up the vehicle cabin by using the refrigeration cycle by the refrigerant.

The heater core 94 is configured to be able to heat up the vehicle cabin by using the exhaust heat of the internal combustion engine 10 that is transmitted to a coolant of the internal combustion engine 10. More specifically, the heater core 94 is connected to a coolant passage 91 of the internal combustion engine 10, releases heat of the coolant that circulates in the coolant passage 91 to air in the vehicle cabin, and thereby heats up the vehicle cabin. In addition to the heater core 94, the coolant passage 91 is provided with an electric water pump WP, a radiator 92, and a thermostat 93.

The coolant in the coolant passage 91 draws the heat generated in the internal combustion engine 10 when passing through the internal combustion engine 10, and thereby cools the internal combustion engine 10. An opening degree of the thermostat 93 is adjusted in accordance with a temperature of the passing coolant and switches a circulation path of the coolant. When the temperature of the coolant is high, the thermostat 93 is opened, and the circulation path of the coolant is switched to a path that runs through the radiator 92 (see an arrow A in FIG. 2). In this way, the heat of the coolant is released to the air on the outside of the vehicle by the radiator 92. In the case where the temperature of the coolant is relatively low such as time immediately after the internal combustion engine 10 is started, the thermostat 93 is closed, and the circulation path of the coolant is switched to a path that does not run through the radiator 92 (see an arrow B in FIG. 2).

The heater core 94 exchanges the heat between the passing coolant and the air that is delivered into the vehicle cabin. In this way, the heat of the coolant that is heated by the exhaust heat of the internal combustion engine 10 is used as the heat for heating.

Here, the coolant passage 91 is further provided with a heat exchanger 95. The heat exchanger 95 is configured to be able to exchange the heat between the coolant that circulates in the coolant passage 91 and the refrigerant that circulates in a refrigerant passage 96 of the refrigeration cycle device 97. Accordingly, during heating, in addition to the exhaust heat of the internal combustion engine 10, the heat of the high-temperature, high-pressure refrigerant that circulates in the refrigerant passage 96 is transmitted to the coolant that flows through the coolant passage 91, and the heat of the coolant can be released from the heater core 94.

Just as described, the air conditioner 90 according to this embodiment includes the heater core 94 that is configured to be able to heat up the vehicle cabin by using the exhaust heat of the internal combustion engine 10.

Returning to FIG. 1, the vehicle 1 includes an air-fuel ratio sensor 86, an oxygen sensor 88, and a differential pressure sensor 89. The air-fuel ratio sensor 86 is provided in a portion of the exhaust passage 80 on an upstream side of the catalyst 82 and detects an air-fuel ratio of the exhaust gas that passes said portion. The oxygen sensor 88 is provided in a portion of the exhaust passage 80 on a downstream side of the catalyst 82 and on an upstream side of the filter 84 and detects an oxygen concentration in the exhaust gas that passes said portion. The differential pressure sensor 89 is provided on a portion of the exhaust passage 80 on the downstream side of the catalyst 82 and on the upstream side of the filter 84 and detects a difference between a pressure in said portion and the atmospheric pressure. These sensors each output a detection result to the ECU 200.

Although not shown, the vehicle 1 includes various sensors other than the above sensors, the various sensors being required for control for the vehicle 1 and including: a sensor that detects a speed of the internal combustion engine 10; a sensor that detects a vehicle speed; a sensor that detects a state of the battery 70; and the like.

Each of these sensors also outputs the detection result to the ECU 200.

The ECU 200 includes a CPU and a memory, which are not shown, therein. The ECU 200 executes specified arithmetic processing on the basis of information from each of the sensors and information stored in the memory and controls each unit of equipment (the internal combustion engine 10, the PCU 60, the air conditioner 90, and the like) of the vehicle 1 on the basis of an arithmetic result.

As described above, the vehicle 1 according to this embodiment includes the heater core 94 that is configured to be able to heat up the vehicle cabin by using the exhaust heat of the internal combustion engine 10.

When a heating request is made, the ECU 200 brings the internal combustion engine 10 into a combustion state, actuates the electric water pump WP to use the exhaust heat of the internal combustion engine 10, and thereby heats up the vehicle cabin by the heater core 94. Hereinafter, this control will also be referred to as "heating control". Note that, for example, when a user performs a heating request operation, or when a temperature of the vehicle cabin is lower than a temperature set by the user, the ECU 200 determines that the heating control is requested.

As described above, the vehicle 1 according to this embodiment includes the filter (GPF) 84 that collects the PM contained in the exhaust gas of the internal combustion engine 10.

When the PM is accumulated on the filter 84, resistance that is generated at a time when the exhaust gas passes the filter 84 is increased. As a result, it is concerned that there is an influence on performance of the internal combustion engine 10 and that parts (an exhaust valve or the like) of an exhaust system is not actuated normally.

Thus, the ECU 200 executes "filter regeneration control" to regenerate the filter 84 by burning the PM, which is accumulated on the filter 84, using the heat of the exhaust gas of the internal combustion engine 10.

Figure 3:
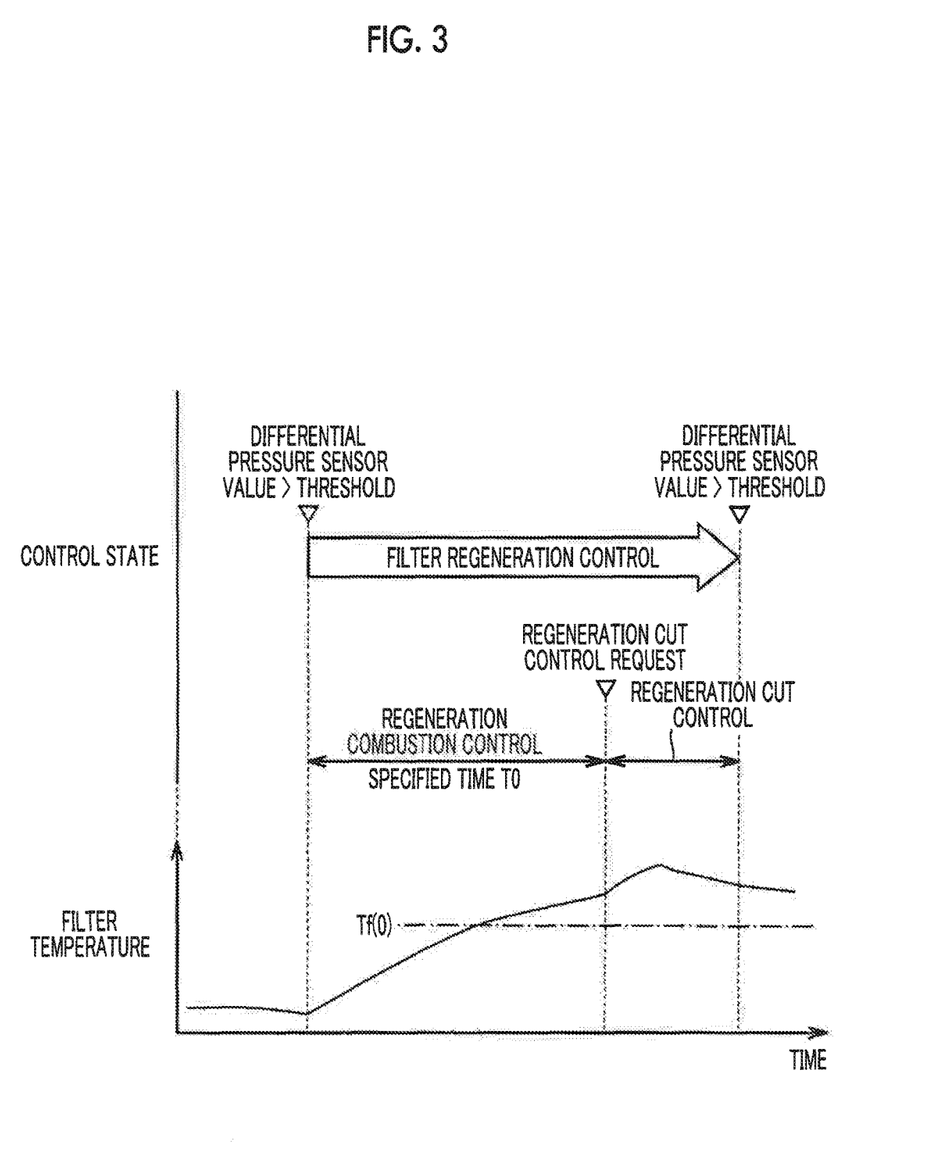
FIG. 3 is a graph that illustrates filter regeneration control.

FIG. 3 is a graph that illustrates the filter regeneration control. In FIG. 3, a horizontal axis represents time, an upper section of a vertical axis represents an example of a change in a control state by the ECU 200, and a lower section of the vertical axis represents an example of a temperature change of the filter 84.

When the PM is accumulated on the filter 84, the resistance that is generated at the time when the exhaust gas passes the filter 84 is increased. Accordingly, a pressure in a portion of the exhaust passage 80 on the upstream side of the filter 84 is increased, and the pressure difference between the pressure in the portion and the atmospheric pressure is increased. To handle this, the ECU 200 according to this embodiment uses an output value of the differential pressure sensor 89 (hereinafter also referred to as a "differential pressure sensor value") to determine whether regeneration of the filter 84 is requested. More specifically, when the differential pressure sensor value is larger than a threshold, the ECU 200 determines that the regeneration of the filter 84 is requested. The threshold is a value used to estimate that an accumulation amount of the PM on the filter 84 is equal to or larger than a specified amount, may be a specified value that is conformed experimentally or in design wise, or may be a value that varies in accordance with an operation state or operation history of the internal combustion engine 10.

Note that a determination method of whether the regeneration of the filter 84 is requested is not limited to a method using the above-described differential pressure sensor 89. The ECU 200 may estimate the accumulation amount of the PM on the filter 84 from the detection results of the air-fuel ratio sensor 86, the oxygen sensor 88, an airflow meter, a throttle opening degree sensor, a coolant temperature sensor, and the like, actuation history of the internal combustion engine 10, or the like, for example. It may be determined that the regeneration of the filter 84 is requested when the estimated accumulation amount of the PM is equal to or larger than the specified amount.

When determining that the regeneration of the filter 84 is requested, the ECU 200 executes the filter regeneration control. The filter regeneration control includes: regeneration combustion control for increasing a temperature of the filter 84; and regeneration cut control for supplying oxygen to the filter 84.

During normal control, the internal combustion engine 10 is brought into an actuation state or a stopped state in accordance with a state of the vehicle 1, for example. Thus, during the normal control, the temperature of the filter 84 is maintained in a lower state than a lower limit temperature Tf(0) of a temperature range that is appropriate for burning of the PM. For this reason, when the regeneration of the filter 84 is requested, the temperature of the filter 84 has to be increased to be higher than the lower limit temperature Tf(0).

When determining the regeneration of the filter 84 is requested (that is, determining that the differential pressure sensor value is larger than the threshold), the ECU 200 first executes the "regeneration combustion control" in which the internal combustion engine 10 is maintained in the combustion state (a state where fuel is combusted in the internal combustion engine 10). In this way, the heat of the exhaust gas of the internal combustion engine 10 is transmitted to the filter 84, and the temperature of the filter 84 is gradually increased. Note that, during execution of the regeneration combustion control, the operation states (a fuel supply amount, ignition timing, an intake air amount, and the like) of the internal combustion engine 10 are controlled such that the temperature of the exhaust gas of the internal combustion engine 10 is increased to be higher than that during the normal control.

When a duration of the regeneration combustion control exceeds a specified time T0, it is estimated that the temperature of the filter 84 has reached a temperature that is sufficiently higher than the lower limit temperature Tf(0). Thus, when the duration of the regeneration combustion control exceeds the specified time T0, the ECU 200 determines that the regeneration cut control is requested.

Note that a determination method of whether the regeneration cut control is requested is not limited to the above determination method. For example, the ECU 200 may estimate the temperature of the filter 84 by using the various sensors such as the air-fuel ratio sensor 86, the oxygen sensor 88, the airflow meter, the throttle opening degree sensor, and the like, and may determine that the regeneration cut control is requested when the estimated temperature of the filter 84 exceeds the lower limit temperature Tf(0).

When determining that the regeneration cut control is requested, the ECU 200 executes the regeneration cut control for stopping fuel injection in the internal combustion engine 10 instead of the regeneration combustion control, and also executes MG1 motoring control for causing rotation of the crankshaft of the internal combustion engine 10 by using the first MG 20. At this time, the ECU 200 controls the first MG 20 such that the speed of the internal combustion engine 10 becomes a predetermined speed.

In this way, a sufficient amount of oxygen for burning of the PM is supplied from the internal combustion engine 10 to the filter 84 in a high-temperature state, and burning of the PM that is accumulated on the filter 84 is promoted. As a result, the temperature of the filter 84 is further increased.

When the PM is removed from the filter 84 by the regeneration cut control, the resistance that is generated at the time when the exhaust gas passes the filter 84 is reduced, and thus the differential pressure sensor value is reduced. Accordingly, when the differential pressure sensor value is reduced to be smaller than a threshold, the ECU 200 determines that the regeneration of the filter 84 is completed, terminates the regeneration cut control and the MG1 motoring control, and resumes the normal control.

Note that the threshold used for the determination on whether the regeneration of the filter 84 is completed may be a specified value that is conformed experimentally or in design wise or may be a value that varies in accordance with the operation state of the internal combustion engine 10. In addition, the threshold that is used for the determination on whether the regeneration of the filter 84 is completed may be the same value as the threshold used for the determination on whether the regeneration of the filter 84 is requested or may be a smaller value than the threshold used for the determination on whether the regeneration of the filter 84 is requested.

Just as described, when the regeneration of the filter 84 is requested, the ECU 200 increases the temperature of the filter 84 to the high temperature by the regeneration combustion control. Then, the ECU 200 supplies the sufficient amount of oxygen to the filter 84 by the regeneration cut control and the MG1 motoring control. In this way, burning of the PM is promoted, and the filter 84 is regenerated.

The above-described heating control and the above-described regeneration cut control contradict each other in a point that, while the heating control brings the internal combustion engine 10 into the combustion state to use the exhaust heat of the internal combustion engine 10 as a heat source for heating, the regeneration cut control stops a fuel supply to the internal combustion engine 10, so as to supply oxygen to the filter 84. Accordingly, in the vehicle 1 that is configured to be able to selectively execute both types of the control, opportunities of the regeneration of the filter 84 by the regeneration cut control are possibly reduced. More specifically, if the regeneration cut control is not executed but the heating control is executed in a situation where both of the heating control and the regeneration cut control are requested, the internal combustion engine 10 is brought into the combustion state. As a result, the sufficient amount of oxygen cannot be supplied to the filter 84. Thus, it is concerned that the PM accumulated on the filter 84 cannot sufficiently be removed.

To handle the above, in the case where the regeneration cut control is requested, the ECU 200 according to this embodiment does not execute the heating control but executes the regeneration cut control even when the heating control is requested. In this way, the opportunities of the regeneration of the filter 84 are suppressed from being reduced due to the heating control. Thus, the opportunities of the regeneration of the filter 84 can be secured.

Figure 4:
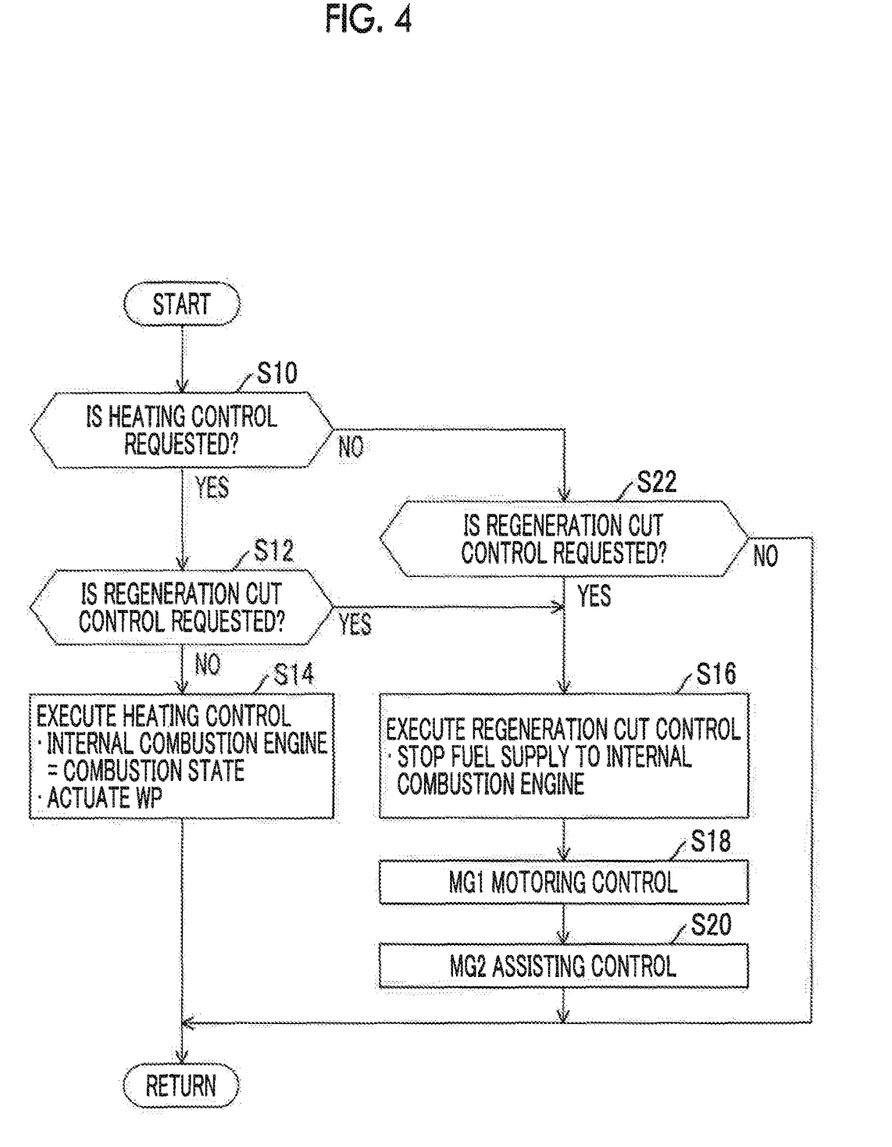
FIG. 4 is a flowchart of one example of a processing procedure by an ECU.

FIG. 4 is a flowchart of one example of a processing procedure that is executed by the ECU 200 according to this embodiment. This flowchart is repeatedly executed in specified cycles.

In step (hereinafter, step is abbreviated as "S") 10, the ECU 200 determines whether the heating control is requested. As described above, for example, when the user performs the heating request operation, or when the temperature of the vehicle cabin is lower than the temperature set by the user, the ECU 200 determines that the heating control is requested.

If the heating control is requested (YES in S10), the ECU 200 determines whether the regeneration cut control is requested (S12). As described above, for example, when the duration of the regeneration combustion control exceeds the specified time T0, the ECU 200 estimates that the temperature of the filter 84 is sufficiently higher than the lower limit temperature Tf(0), and determines that the regeneration cut control is requested.

If not determining that the regeneration cut control is requested (NO in S12), the ECU 200 executes the above-described heating control (S14). More specifically, the ECU 200 brings the internal combustion engine 10 into the combustion state and actuates the electric water pump WP. In this way, heating by the heater core 94 is performed by using the generated heat in the internal combustion engine 10.

On the other hand, if determining that the regeneration cut control is requested (YES in S12), the ECU 200 does not execute the above-described heating control but executes the regeneration cut control (S16). More specifically, the ECU 200 stops the fuel supply to the internal combustion engine 10.

Next, the ECU 200 executes the above-described MG1 motoring control (S18). More specifically, the ECU 200 uses the first MG 20 to cause the rotation of the crankshaft of the internal combustion engine 10 such that the speed of the internal combustion engine 10 becomes the predetermined speed.

Next, the ECU 200 executes MG2 assisting control in which the power of the second MG 30 compensates for the drive power by the internal combustion engine 10, which is reduced by the regeneration cut control (S20).

Note that, if the heating control is not requested (NO in S10), the ECU 200 determines whether the regeneration cut control is requested (S22). If determining that the regeneration cut control is requested (YES in S22), the ECU 200 executes the regeneration cut control and the MG1 motoring control (S16, S18), and also executes the MG2 assisting control (S20). On the other hand, if not determining that the regeneration cut control is requested (NO in S22), the ECU 200 skips the processing in S18 to S20, and the processing proceeds to RETURN.

As it has been described so far, in the case where the regeneration cut control is requested, the ECU 200 according to this embodiment does not execute the heating control but executes the regeneration cut control even when the heating control is requested. In this way, the opportunities of the regeneration of the filter 84 are suppressed from being reduced by the heating control. As a result, in the vehicle 1 that is configured to be able to selectively execute the heating control, in which the exhaust heat of the internal combustion engine 10 is used, and the regeneration cut control for stopping the fuel supply to the internal combustion engine 10, the opportunities of the regeneration of the filter 84 can be secured.

Furthermore, when executing the regeneration cut control, the ECU 200 executes the MG1 motoring control for causing the rotation of the crankshaft of the internal combustion engine 10 by using the first MG 20. Accordingly, even when the fuel supply to the internal combustion engine 10 is stopped by the regeneration cut control, the first MG 20 can maintain the internal combustion engine 10 in a rotating state. In this way, a required amount of oxygen for the regeneration of the filter 84 can stably be supplied from the internal combustion engine 10 to the filter 84.

Moreover, when executing the regeneration cut control, the ECU 200 executes the MG2 assisting control in which the power of the second MG 30 compensates for the drive power by the internal combustion engine 10, which is reduced by the regeneration cut control. Accordingly, even when the regeneration cut control stops the fuel supply to the internal combustion engine 10, the vehicle 1 can continue traveling by using the power of the second MG 30. Thus, the vehicle 1 can continue traveling while the regeneration of the filter 84 is executed.

Note that the description has been made on the case where the vehicle 1 is the hybrid vehicle in the above-described embodiment; however, the vehicle to which the present disclosure can be applied is not limited to the hybrid vehicle and may be a vehicle that only has the internal combustion engine 10 as a drive source, for example. In the case where the present disclosure is applied to the vehicle that only has the internal combustion engine 10 as the drive source, the processing in S18 and the processing in S20 in FIG. 4, which are described above, are eliminated. In addition, in S12 and S22, for example, if the differential pressure sensor value exceeds the threshold, if an estimated temperature of the filter 84 exceeds the lower limit temperature Tf(0), and if the vehicle is currently decelerated or traveling downhill (is in a state where the internal combustion engine 10 runs by the power from the drive wheels), it can be determined that the regeneration cut control is requested. In this way, also in the vehicle that only has the internal combustion engine 10 as the drive source, the opportunities of the regeneration of the filter 84 by the regeneration cut control can be secured.

It should be understood that the embodiment disclosed herein is given as a mere illustration in all respects but not given to impose any limitation. The scope of the present disclosure is defined by the scope of the claims rather than the above description and is intended to include all modifications falling within the scope of the claims and equivalents thereof.

What is claimed is:

1. A vehicle comprising:
an internal combustion engine;
a filter configured to collect particulate matter contained in exhaust gas of the internal combustion engine;
a heater configured to be able to heat up a vehicle cabin by using exhaust heat of the internal combustion engine; and
an electronic control unit configured to execute regeneration cut control and heating control, the regeneration cut control being a control for regenerating the filter by stopping a fuel supply to the internal combustion engine and supplying oxygen to the filter in a state where an output shaft of the internal combustion engine rotates, and the heating control being a control for bringing the internal combustion engine into a combustion state and heating by the heater using exhaust heat of the internal combustion engine, the electronic control unit being configured to execute the heating control when the heating control is requested and not to execute the heating control but to execute the regeneration cut control when the heating control is requested and the regeneration cut control is requested.

2. The vehicle according to claim 1 further comprising:
a first rotary electric machine connected to the internal combustion engine, wherein
the electronic control unit is configured to stop the fuel supply to the internal combustion engine and make the output shaft of the internal combustion engine rotate by using power of the first rotary electric machine when executing the regeneration cut control.

3. The vehicle according to claim 2 further comprising:
a drive wheel; and
a second rotary electric machine connected to the drive wheel, wherein
the electronic control unit is configured to make the drive wheel rotate by using power of the second rotary electric machine during execution of the regeneration cut control.

4. A control method for a vehicle,
the vehicle including an internal combustion engine, a filter, a heater, and an electronic control unit,
the filter configured to collect particulate matter contained in exhaust gas of the internal combustion engine,
the heater configured to be able to heat up a vehicle cabin by using exhaust heat of the internal combustion engine, and
the electronic control unit configured to execute regeneration cut control and heating control,
the control method comprising:
executing, by the electronic control unit, the heating control when the heating control is requested; and
not executing, by the electronic control unit, the heating control but executing the regeneration cut control when the heating control is requested and the regeneration cut control is requested,
the regeneration cut control being a control for regenerating the filter by stopping a fuel supply to the internal combustion engine and supplying oxygen to the filter in a state where an output shaft of the internal combustion engine rotates, and the heating control being a control for bringing the internal combustion engine into a combustion state and heating by the heater using exhaust heat of the internal combustion engine.

* * * * *